Jan. 28, 1969  J. F. LOTSPEICH  3,424,513
ELECTRO-OPTIC VARIABLE FOCAL LENGTH LENS
Filed June 20, 1966

Jan. 28, 1969　　　J. F. LOTSPEICH　　　3,424,513
ELECTRO-OPTIC VARIABLE FOCAL LENGTH LENS
Filed June 20, 1966　　　　　　　　Sheet 3 of 3

James F. Lotspeich,
INVENTOR.
BY
*J. K. Haskell*
ATTORNEY.

United States Patent Office 3,424,513
Patented Jan. 28, 1969

3,424,513
ELECTRO-OPTIC VARIABLE FOCAL LENGTH LENS
James F. Lotspeich, Malibu, Calif., assignor to Hughes Aircraft Company, Culver City, Calif., a corporation of Delaware
Filed June 20, 1966, Ser. No. 558,802
U.S. Cl. 350—180
Int. Cl. G02b 1/06
6 Claims This invention relates to a variable focal length lens and more particularly to a means for varying the focal length of an optical lens system by purely electrical control.

In the past, methods for varying focal lengths in optical systems have relied upon physical displacements of one fixed focal length lens relative to others, by manual, mechanical, or electro-mechanical means. These methods have the disadvantage of requiring moving parts prone to wear and must be either focused manually or by a complex servo system that is power consuming.

Contrary to the prior art, the invention to be described hereinafter has the advantage of having no moving parts and can be controlled by purely electrical means which consumes no appreciable power and which also lends itself to simple servo control circuitry when automatic operation is required.

The invention therefore has advantageous applications in optical space communication systems employing laser transmitters. For example, if the narrow beam from a laser is passed through the lens according to the invention, it can be spread out into a cone to facilitate initial contact with the receiving station and then narrowed down once contact is made. Likewise, this lens can be used by the receiver to optimize the field of view and subsequently "zero in" on the point of transmission. As will be shown later, the angular field of view of better than 5 degrees is possible with this device. A still further possible application of the invention is in the space navigation by star tracking field.

It is therefore an object of the present invention to provide an improved variable focal length lens.

It is another object of the invention to provide a variable focal length lens system having purely electrical control.

It is still another object of this invention to provide a variable focal length lens capable of automatic control with the use of little if any power.

It is yet another object of the present invention to provide an electro-optic variable focal length lens capable of an angular field of view of better than 5 degrees.

These and other objects of the invention are obtained by utilizing two identical parallel arrays of cylindrical rods arranged in tandem and immersed in a Kerr effect medium such as, for example, nitrobenzene. Each of the arrays contains four rods evenly spaced on a circle as viewed in cross section, with one array rotated 45 degrees with respect to the other. The rods are charged alternately positive and negative from a source of variable high voltage. A narrow, cylindrical parallel beam of light passing axially through this arrangement will emerge conically divergent, the amount of the divergence depending upon the applied voltage. To this point, there has been generally described a negative lens of variable focal length; however, a variable focal length positive lens is provided by placing a conventional positive lens element at the exit end of the beam.

The invention and specific embodiments thereof will be described hereinafter by way of example and with reference to the accompanying drawings wherein like reference numerals refer to like elements or parts, and in which.

Figure 1:
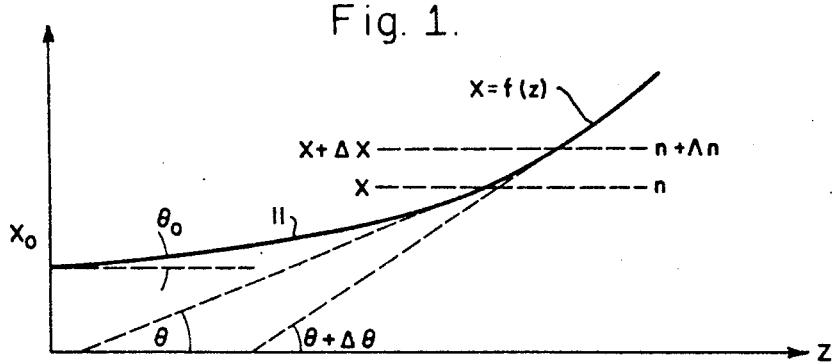
FIG. 1 is a theoretical plot of a beam of light passing through a medium of varying index of refraction.

In describing the theory of operation of the invention, reference is made to FIG. 1 whereat the trajectory of a ray of light is shown. The device to be described operates on the physical principle that a beam of light, such as indicated by line 11, traversing a medium whose index of refraction has a gradient transverse to the direction of propagation will be bent in the direction of higher index. The path of the ray is a curve $x=f(z)$ and its derivative is $dx/dz=\tan \theta$. By Snell's Law, the change in the direction of the beam as it passes from $x$ to $x+\Delta x$ (and from a region of index $n$ to $n+\Delta n$) obeys the relation $$n \cos \theta = (n+\Delta n) \cos (\theta+\Delta \theta)$$

Thus, the quantity $n \cos \theta$ is a "constant of motion," and its total differential is zero. That is $$-n \sin \theta \Delta \theta + \cos \theta \Delta n = 0$$

or $$\tan \theta \Delta \theta = \frac{\Delta n}{n} = \frac{1}{n} \frac{dn}{dx} \frac{dx}{dz} \Delta z = \frac{1}{n} \frac{dn}{dx} \tan \theta \Delta z$$

The equation of motion for $\theta$ is therefore:

$$\frac{d\theta}{dz} = \frac{1}{n} \frac{dn}{dx}$$

Since $\theta$ will in practice be small, it can be approximated that $\theta = \tan \theta = dx/dz$. This yields an equation of motion for $x$:

$$\frac{d^2x}{dz^2} = \frac{1}{n} \frac{dn}{dx}$$

These equations will be used to solve the trajectories within the electro-optic lens. Initially, the ray paths within a single electrode unit will be dealt with.

To a good approximation, the potential within the interior of a four-pole electrode array of the type and geometry under consideration is given by $$\phi(x, y) = \frac{\phi_0}{R_m^2} \mathrm{Re}(x+iy)^2 = \frac{\phi_0}{R_m^2}(x^2-y^2)$$

where $R_m$ is the radius of the inscribed circle. The electric field components are $$E_x = -\frac{\partial \phi}{\partial x} = -\frac{2\phi_0}{R_m^2}x; \quad E_y = -\frac{\partial \phi}{\partial y} = +\frac{2\phi_0}{R_m^2}y$$

Figure 2:
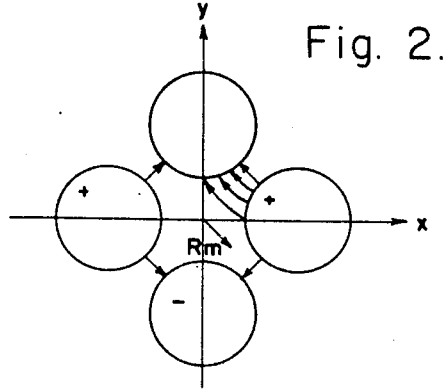
FIG. 2 is a simplified illustration of a quadrupolar arrangement immersed in active medium.

These relationships are good approximations so long as $R=(x^2+y^2)^{1/2}<R_m$, and the rod radius is not less than about ½ $R_m$. Except for edge effects at the ends of the rods, the potential and field components do not depend upon the axial, or $z$, coordinate. The coordinate system and field lines are as shown in FIG. 2.

If the medium within this field is nitrobenzene (or some other Kerr effect substance having similar electro-optic properties), the index of refraction at a given point $(x, y)$ will have the following values:

$$n_\mathrm{p}=n_0+2\lambda BE^2$$
$$n_\mathrm{s}=n_0+\lambda BE^2$$

These are the equations for the Kerr effect where $n_\mathrm{p}$ is the refractive index for light travelling across the E field and polarized in the direction of E, $n_\mathrm{s}$ is the refractive index for light polarized perpendicular to E, $n_0$ is the index in zero field, $\lambda$ is the light wavelength, and B is the Kerr constant. For practical field magnitudes, $\lambda BE^2 \ll n_0$. For a description of Kerr effect, reference can be made to a book authored by R. W. Ditchburn entitled, "Light," published by the Interscience Publishers Division of John Wiley & Son, New York, 1963, second edition, p. 638.

A ray of light of wavelength $\lambda$ is considered in the $x$–$z$ plane, polarized in the $x$-direction, and having initial value $x_0$ and inclination $\theta_{x0}$. The equations of motion for $x(z)$ and $\theta_x(z)$ are $$\frac{d^2x}{dz^2} = \frac{1}{n_p}\frac{dn_p}{dx} \doteq \frac{1}{n_0}\frac{dn_p}{dE_x}\frac{dE_x}{dx} = \frac{4\lambda B}{n_0}\left(\frac{2\phi_0}{R_m^2}\right)^2 x = K_p^2 x$$

$$\frac{d\theta_x}{dz} = \frac{1}{n_p}\frac{dn_p}{dx} = K_p^2 x$$

$$\frac{d^2\theta_x}{dz^2} = K_p^2 \frac{dx}{dz} = K_p^2 \tan \theta_x \doteq K_p^2 \theta_x$$

The solutions to these equations are $$\theta_x(z) = \theta_{x0} \cosh K_p z + K_o x_0 \sinh K_p z$$

$$x(z) = x_0 \cosh K_p z + K_p^{-1} \theta_{x0} \sinh K_p z$$

It is to be noted that if $\theta_{x0}=0$, that is, if the ray enters parallel to the $z$-axis, and if after traversing a distance $l$ it emerges from the electrode unit, it will appear to have come from a point on the $z$-axis $$z_{fx} = l - \frac{x(l)}{\tan \theta_x(l)} \doteq l - \frac{x(l)}{\theta_x(l)} = l - \frac{\coth K_p l}{K_p}$$

Since this point is independent of $x_0$, it is uniquely defined for any ray in the $x$–$z$ plane and having $x$-polarization. It is therefore a focal point.

In similar manner a ray having $x$-polarization and travelling in the $y$–$z$ plane sees an electric field transverse to its plane of polarization. The trajectories now involve $n_s$ and $E_y$, and are given by $$\theta_y(z) = \theta_{y0} \cosh K_s z + K_s y_0 \sinh K_s z$$

$$y(z) = y_0 \cosh K_s z + K_s^{-1} \theta_{y0} \sinh K_s z$$

The focal point in this case is given by $$z_{fy} = l - \frac{\coth K_s l}{K_s}$$

Here $$K_s^2 = \frac{2\lambda B}{n_0}\left(\frac{2\phi_0}{R_m^2}\right)^2$$

and thus $$K_s = K_p / 2^{1/2}$$

The focal points $z_{fx}$ and $z_{fy}$ are therefore unequal.

Plane-polarized rays which are neither in the $x$–$z$ nor $y$–$z$ plane will have ambiguous focal points associated with them and will in general emerge elliptically polarized.

By adding a second paraxial electrode system in tandem with the first and identical to it but rotated relative to it by 45 degrees about the optic or $z$-axis as described at the beginning, the problem of having two focal points is virtually eliminated, as will be shown in the following discussion. Also, it can be shown that for sufficiently low electrode voltages (producing focal lengths in excess of 100 cm.), the ellipticity generated in off-axis rays is almost completely cancelled out. In other words, the original polarization character of the incident beam is essentially restored.

Now, two rays are considered, each entering parallel to the $z$-axis, each polarized in the $x$-direction, one in the $x$–$z$ plane and the other in the $y$–$z$ plane. Their paths in the first unit are $$\theta_x = K_p x_0 \sinh K_p z \qquad \theta_y = K_s y_0 \sinh K_s z$$
$$x = x_0 \cosh K_p z \qquad y = y_0 \cosh K_s z$$

If the second unit is rotated $+45°$ relative to the first, the field components referred to the original coordinate system become $$E_x = \frac{2\phi_0}{R_m^2} y, \quad E_y = \frac{2\phi_0}{R_m^2} x$$

Thus, at every point the field in the second unit is orthogonal to that in the first, and the ray equations become $$\theta'_x = \theta'_{x0} \cosh K_s z + K_s x'_0 \sinh K_s z$$

$$x' = x'_0 \cosh K_s z + K_s^{-1} \theta'_{x0} \sinh K_s z$$

$$\theta'_y = \theta'_{y0} \cosh K_p z + K_p y'_0 \sinh K_p z$$

$$y' = y'_0 \cosh K_p z + K_p^{-1} \theta'_{y0} \sinh K_p z$$

Let the length of each unit be $l$, and assume the second unit very close to the first. Then $$x'_0 = x(l) = x_0 \cosh K_p l \qquad y'_0 = y(l) = y_0 \cosh K_s l$$
$$\theta'_{x0} = \theta_x(l) = K_p x_0 \sinh K_p l \qquad \theta'_{y0} = \theta_y(l) = K_s y_0 \sinh K_s l$$

At the end of the second unit, $$\theta'_x(l) = K_p x_0 \sinh K_p l \cosh K_s l + K_s x_0 \cosh K_p l \sinh K_s l$$
$$x'(l) = x_0 \cosh K_p l \cosh K_s l + K_s^{-1} K_p x_0 \sinh K_p l \sinh K_s l$$
$$\theta'_y(l) = K_s y_0 \sinh K_s l \cosh K_p l + K_p y_0 \cosh K_s l \sinh K_p l$$
$$y'(l) = y_0 \cosh K_s l \cosh K_p l + K_p^{-1} K_s y_0 \sinh K_s l \sinh K_p l$$

It can be seen that if $y_0 = x_0$, then $\theta'_x(l) = \theta'_y(l)$ and that $x'(l)$ differs from $y'(l)$ only in the second member; that is $$K_p^{-1} K_p = 2^{1/2} \text{ and } K_s^{-1} K_s = 2^{-1/2}$$

Note also that the $x'$- and $y'$- focal points are still independent of the initial values $x_0$ and $y_0$.

The extent to which the differences in $x'(l)$ and $y'(l)$ affect their respective focal points has been examined by plotting the ratios $$f'_x = \frac{x'(l)}{n_0 \theta'_x(l)} \text{ and } f'_y = \frac{y'(l)}{n_0 \theta'_y(l)}$$

as a function of the applied voltage. The values of $$f'_x \text{ and } f'_y$$

represent the focal points on the $z$-axis measured in the negative direction from the end of the second electrode unit. The appearance of $n_0$ in the denominator of these expressions allows for refraction of the ray as it passes out of the lens system into air.

Two physical cases are considered, for each of which $l = 10$ cm., $\lambda = 6.33 \times 10^{-5}$ cm., $n_0 = 1.55$, $B = 2.2 \times 10^{-5}$ cm.²/statvolt₂.

Figure 3:
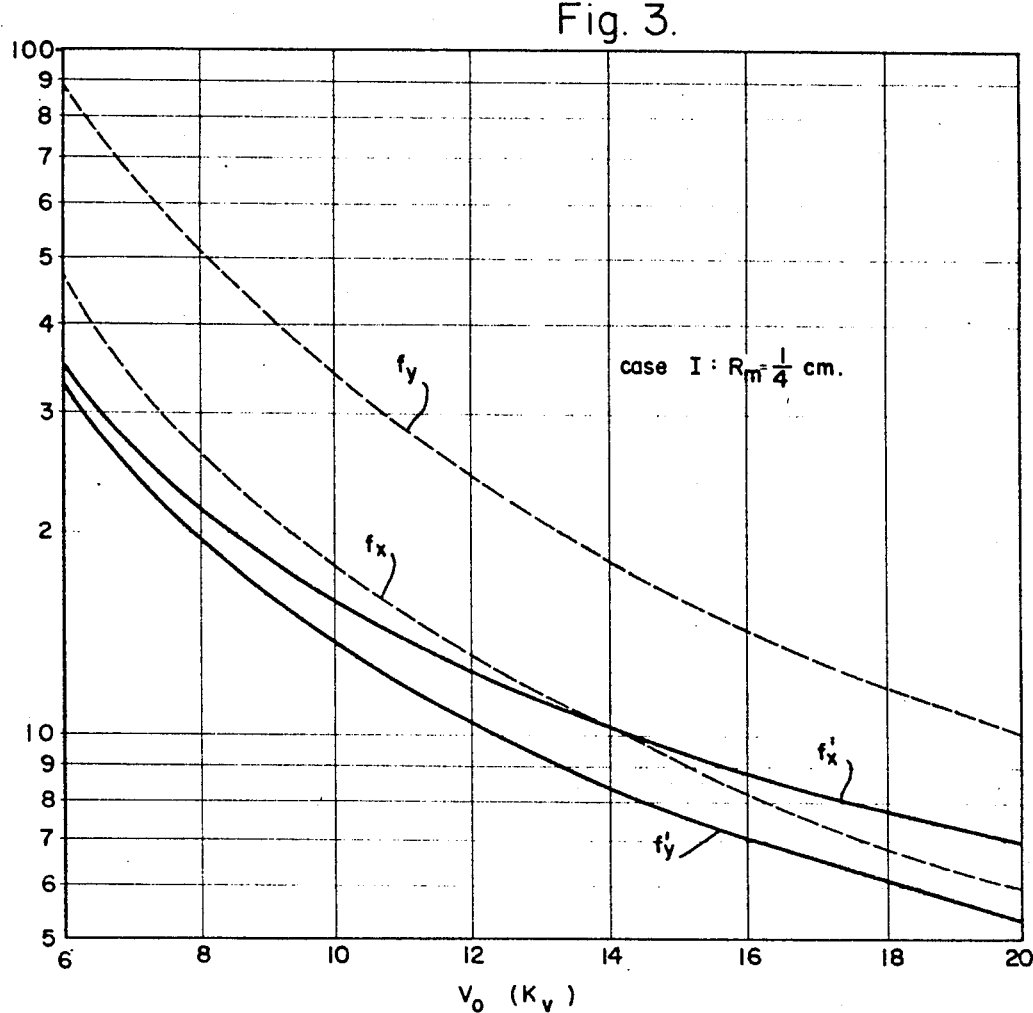
FIGS. 3 and 4 are graphs illustrating two cases for comparison which represent the $x$- and $y$- focal points.
Figure 4:
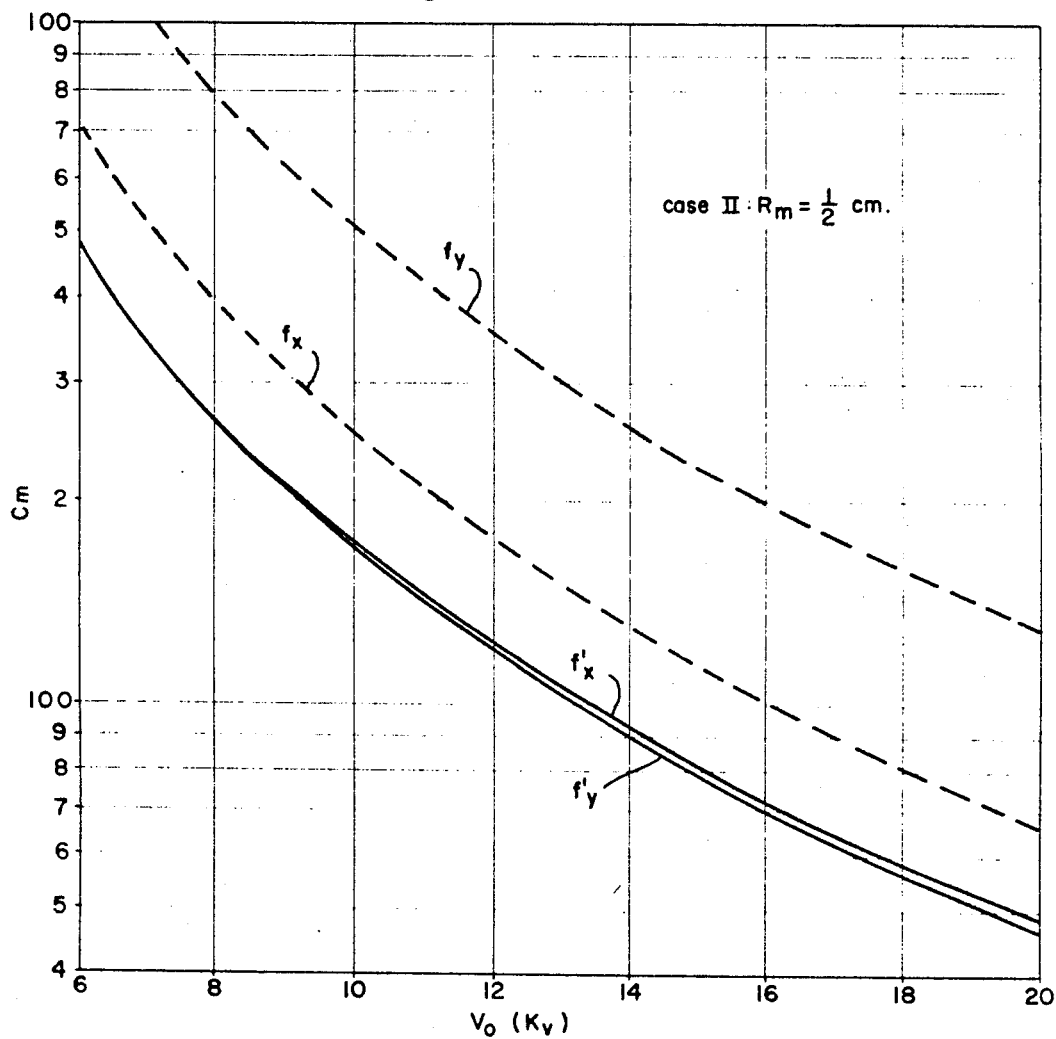

Case I. $R_m = 1/4$ cm. $K_p = 6.4 \times 10^{-3} V_0$
$\qquad\qquad\qquad\qquad K_s = 4.53 \times 10^{-3} V_0$ Case II. $R_m = 1/2$ cm. $K_p = 1.6 \times 10^{-3} V_0$
$\qquad\qquad\qquad\qquad K_s = 1.13 \times 10^{-3} V_0$ $V_0$ in $kV$ The graphs are shown in FIGS. 3 and 4. Also shown for comparison are the curves (in dashed lines) of $$f_x = \frac{x(l)}{n_0 \theta_x(l)} \text{ and } f_y = \frac{y(l)}{n_0 \theta_y(l)}$$

which represent the $x$- and $y$- focal points measured in the negative direction from the end of the first electrode unit if it alone is used. The approach toward a common focal point for the $x$ and $y$ rays is pronounced as a result of adding the second electrode unit. With a single unit, $f_x$ and $f_y$ differ by an almost exact factor of 2 throughout the voltage range whereas the values of $$f'_x \text{ and } f'_y$$

differ by a nearly constant amount of approximately 2 cm. The tabulated results appear below. Values of $V_0$ are in $kV$; the $f$ values are in cm.

| | $R_M = \frac{1}{4}$ cm. | | | | $R_M = \frac{1}{2}$ cm. | | | |
|---|---|---|---|---|---|---|---|---|
| $V_o$ | $f'_x$ | $f'_y$ | $f_x$ | $f_y$ | $f'_x$ | $f'_y$ | $f_x$ | $f_y$ |
| 1 | 1,055 | 1,053 | 1,576 | 3,160 | 16,800 | 16,800 | 25,200 | 50,500 |
| 2 | 268 | 266 | 396 | 785 | 4,210 | 4,210 | 6,290 | 12,630 |
| 3 | 122 | 120 | 177 | 353 | 1,873 | 1,872 | 2,795 | 5,610 |
| 4 | 71.1 | 69.0 | 101.4 | 199 | 1,056 | 1,054 | 1,574 | 3,160 |
| 5 | 47.4 | 45.3 | 65.3 | 128.3 | 678 | 676 | 1,011 | 2,023 |
| 6 | 34.5 | 32.4 | 45.9 | 89.5 | 473 | 471 | 703 | 1,407 |
| 8 | 21.7 | 19.6 | 26.7 | 51.2 | 268 | 266 | 396 | 785 |
| 10 | 15.6 | 13.6 | 17.8 | 33.6 | 174 | 172 | 254 | 508 |
| 12 | 12.3 | 10.3 | 13.0 | 23.9 | 122 | 120 | 177 | 353 |
| 14 | 10.5 | 8.3 | 10.1 | 18.1 | 91.5 | 89.3 | 131 | 259 |
| 16 | 8.74 | 6.96 | 8.2 | 14.3 | 71.3 | 69.1 | 101.4 | 199 |
| 18 | 7.70 | 6.01 | 6.8 | 11.7 | 57.4 | 55.4 | 80.1 | 158.5 |
| 20 | 6.89 | 5.30 | 5.9 | 9.9 | 47.7 | 45.6 | 65.3 | 128.3 |

The small difference of about 2 cm. between $$f'_x \text{ and } f'_y$$

represents perhaps the only fundamental limitation of this device in comparing it to an ideal lens. However, for focal lengths of perhaps 10 cm. or more, this amount of astigmatism should not present a major problem for many applications.

Figure 5:
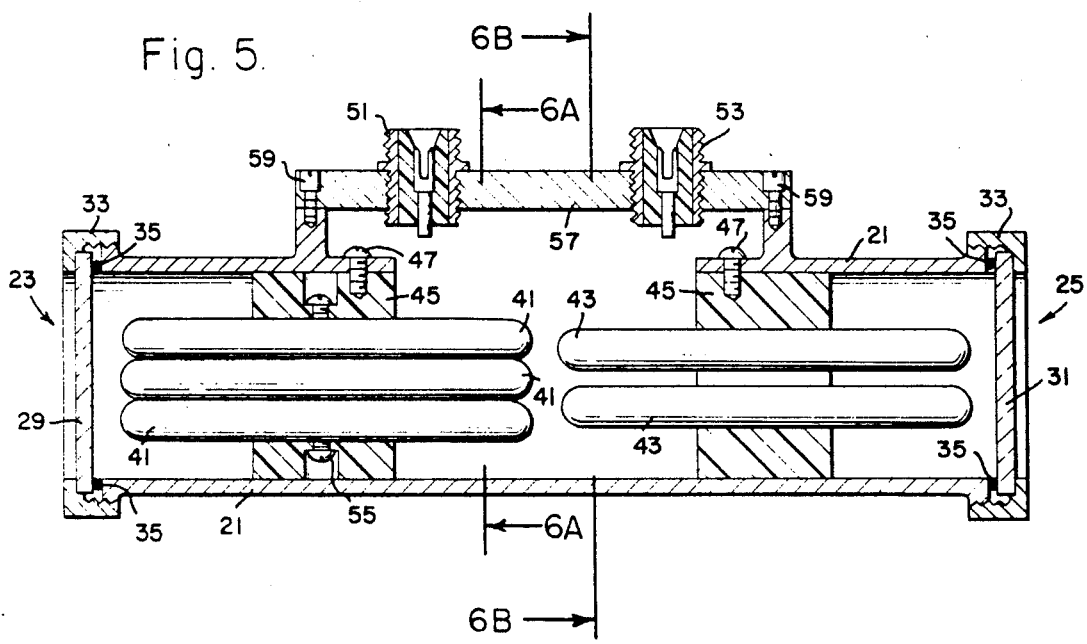
FIG. 5 is an illustration of one possible physical arrangement of the invention.

With reference now to FIG. 5, there is shown an illustration of a basic embodiment of the invention. The lens includes a cylindrical chamber housing 21 of such materials, for example, as steel or aluminum having end openings 23 and 25 and an elongated top opening 27. End windows 29 and 31 are sealed in place in the end openings 23 and 25, respectively, by means of threaded annular cap rings 33 and sealing O rings 35 of neoprene Buna-N, for example (rubber is not recommended). The end windows 29 and 31 are fabricated from optical quality glass plate or material of similar qualities and characteristics.

Figure 6A:
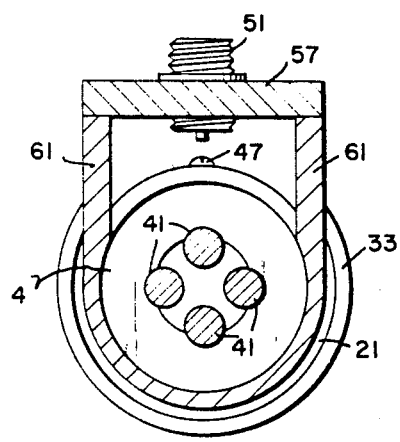
FIGS. 6A and 6B are end views of the variable lens of FIG. 5.
Figure 6B:
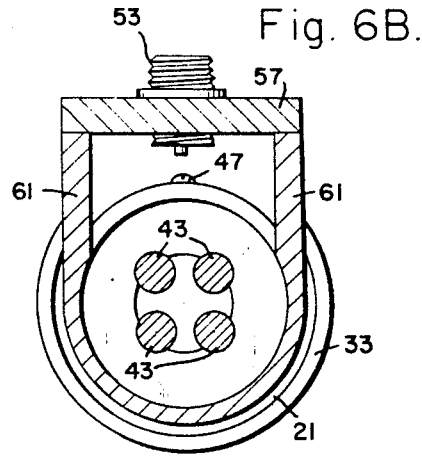

Within the chamber housing 21 are mounted two identical parallel arrays 37 and 39 each consisting of four cylindrical rods 41 in the first array 37 and rods 43 in the second array 39. These arrays are supported in tandem within the chamber housing 21 by dielectric support members 45 which are held in place by screws 47, for example. The rods 41 and 43 of each array are evenly spaced on a circle as viewed in the cross-sectional views of FIGS. 6A and 6B, with the second array 39 rotated 45 degrees with respect to the first array 37.

Figure 7:
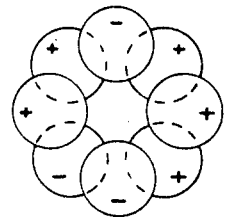
FIG. 7 is a simplified schematic representation of the basic arrangement of the rods making up the two quadrupolar arrays of the invention.

The rods 41 and 43 of the two arrays 37 and 39, respectively, are charged alternately positive and negative as shown by the schematic end view of FIG. 7, from a source of variable high voltage not shown. This is accomplished by means of high voltage insulated terminals 51 and 53 suitably connected by wires or straps, not shown for the sake of clarity, to the rods 41 and 43.

The dielectric support members 45 of such material as Teflon are drilled and the rods 41 and 43 tapped to accommodate the retaining screws 55. The cylindrical rods themselves may be fabricated from stainless steel or nickel-plated brass, for example, and polished to a high luster.

The high voltage terminals 51 and 53 are shown supported in the top opening 27 of the chamber housing 21 by a cover plate 57 of similar material as that used for the housing 21, or glass may be substituted to allow visual access to the interior of the chamber. The cover plate 57 is appropriately drilled to accommodate the high voltage insulated terminals 51 and 53 and screws 59 which engage suitably placed tapped holes in a lip portion 61 of the chamber housing 21 around the periphery of the top opening 27.

The power supply to be used with this device should be adjustable and capable of providing at least up to 20,000 volts at a small current drain of the order of at most 10 ma. between adjacent rods. The arrays 41 and 43 are immersed, in this embodiment of the invention, in a solution of a Kerr effect material such as nitrobenzene (not shown) as described previously, preferably after the interior of the chamber housing 21 is thoroughly cleaned and degreased to avoid possible contamination of the active fluid. The latter should likewise be of the highest possible purity.

The limit of the angular field of view obtainable with this device is ultimately the breakdown voltage of the active fluid. That is, Kerr effect materials with the higher insulative properties will render greater variability of focal length where other parameters are maintained constant.

It is to be noted that the invention is specifically limited to Kerr effect materials, either liquid or solid, as the active medium in the area of the tandemly arranged quadrupolar arrays. This material exhibits a change in refractive index dependent upon the square of the applied voltage which results in a spatial variation in its index of such a nature as to render an incident beam conically divergent as would occur with a conventional negative lens (except, of course, for the fact that the invention has a variable focal length). The use of quadrupolar array of electrodes to produce a spatially-varying refractive index in an electro-optic medium, not of the Kerr effect type, would not provide a variable lens effect. For example, the use of a properly oriented Pokels effect material, such as potassium dihydrogen phosphate, as the active medium for a quadrupolar arrangement would cause a simple bending or deflection of an incident parallel (polarized) beam through a given small angle with no effective change in the cross section of the beam. This is due to the fact that such material exhibits a linear relationship as to its index of refraction with respect to the applied voltage.

From the foregoing, it should be seen that the invention provides an improved variable focal length lens having a purely electrical control that can be automatically varied with little power consumption.

In practicing this invention, any source of monochromatic light producing a narrow parallel beam of light may be utilized. Also, many other Kerr effect materials, either in liquid or solid form can be substituted for the nitrobenzene described, with varying degrees of sensitivity. For example, $CS_2$ (a liquid) or Potassium Tantalate Niobate (KTN) which is a solid may be used.

Accordingly, it is intended that the foregoing disclosure and drawings shall be considered only as illustrations of the principles of this invention and are not to be construed in a limiting sense.

What is claimed is:

1. An electro-optic variable focal length lens, comprising:
   (A) means including a Kerr effect medium transparent to optical frequency energy and adapted to intercept a narrow beam of substantially parallel and monochromatic light and transmit said beam therethrough along a beam axis;
   (B) first and second parallel arrays of quadrupolar cylindrical rods arranged in tandem and disposed in said medium, each of said arrays comprising four of said rods evenly spaced about and parallel with said beam axis, one of said arrays being rotated about said axis 45 degrees with respect to the other of said arrays; and (C) means for placing a controllable positive and negative direct-current charge alternately on said rods for causing said beam to be conically diverged dependent on the magnitude of the charge placed on said rods.

2. An electro-optic variable focal length lens, comprising:
   (A) means including a container having optically transparent end portions and containing a Kerr effect medium transparent to optical frequency energy and adapted to intercept a narrow beam of substantially parallel and monochromatic light at one of said end portions and transmit said beam therethrough along said axis and out of the other of said end portions;
   (B) first and second parallel arrays of quadrupolar cylindrical metallic rods arranged in tandem and disposed in said medium, each of said arrays comprising four of said rods evenly spaced about and parallel to said beam axis, one of said arrays being rotated about said axis 45 degrees with respect to the other of said arrays; and
   (C) means for placing a controllable positive and negative direct-current charge alternately on said rods for causing said beam to be conically diverged dependent on the magnitude of the charge placed on said rods.

3. An electro-optic variable focal length lens, comprising:
   (A) a longitudinal container structure having two optically transparent end windows positioned thereon and containing a Kerr effect medium, transparent to optical frequency energy, said structure being adapted to intercept a relatively narrow beam of substantially parallel and monochromatic light through one of said windows and transmit said beam through said structure generally along the longitudinal axis thereof and out of the other of said windows;
   (B) first and second parallel arrays of quadrupolar cylindrical metallic rods arranged in tandem and disposed in said medium, each of said arrays comprising four of said rods evenly spaced about and parallel to said axis, one of said arrays being rotated about said axis 45 degrees with respect to the other of said arrays; and
   (C) means including insulated terminals mounted on said structure and adapted to be attached to a source of controllable high voltage direct-current potential for placing a controllable positive and negative charge alternately on said rods and causing said beam to be conically diverged dependent on the magnitude of the charge placed on said rods.

4. An electro-optic variable focal length lens according to claim 3, wherein said Kerr effect medium is nitrobenzene.

5. An electro-optic variable focal length lens according to claim 3, wherein said Kerr effect medium is $CS_2$.

6. An electro-optic variable focal length lens according to claim 3, wherein said Kerr effect medium is KTN.

References Cited

UNITED STATES PATENTS 1,923,891   8/1933   Skaupy.
2,836,652   5/1958   Sprague.

DAVID SCHONBERG, *Primary Examiner.*

RONALD J. STERN, *Assistant Examiner.*

U.S. Cl. X.R.

350—150, 160, 175